(12) United States Patent
Nishida et al.

(10) Patent No.: US 11,627,127 B2
(45) Date of Patent: Apr. 11, 2023

(54) AUTHENTICATION AND AUTHORIZATION SYSTEM AND AUTHENTICATION AND AUTHORIZATION METHOD USING ACCESS TOKENS

(71) Applicant: Hitachi, Ltd., Tokyo (JP)

(72) Inventors: Toshio Nishida, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 29 days.

(21) Appl. No.: 17/017,960

(22) Filed: Sep. 11, 2020

(65) Prior Publication Data
US 2021/0176237 A1 Jun. 10, 2021

(30) Foreign Application Priority Data
Dec. 5, 2019 (JP) .............................. JP2019-220470

(51) Int. Cl.
*H04L 9/40* (2022.01)
*G06F 9/54* (2006.01)
(52) U.S. Cl.
CPC .......... *H04L 63/0853* (2013.01); *G06F 9/547* (2013.01)
(58) Field of Classification Search
CPC .............................. H04L 63/0853; G06F 9/547
USPC .............................................................. 726/6
See application file for complete search history.

(56) References Cited

U.S. PATENT DOCUMENTS 8,862,874 B2 * 10/2014 Hazlewood ........... H04L 9/3271
713/158
9,608,970 B1 * 3/2017 Gehret ..................... G07C 9/22
11,258,786 B2 * 2/2022 Bansal ............... G06Q 20/3821
2007/0248232 A1 * 10/2007 Driscoll ............ H04W 12/0431
713/153
2014/0032759 A1 * 1/2014 Barton .................. H04W 12/08
709/225
2014/0359098 A1 * 12/2014 Xu .......................... G06F 21/45
709/223
2015/0341347 A1 * 11/2015 Kong .................. H04L 63/0853
726/4

(Continued)

FOREIGN PATENT DOCUMENTS

JP 2019-139621 A 8/2019

OTHER PUBLICATIONS

Japanese Office Action received in corresponding Japanese Application No. 2019-220470 dated Feb. 14, 2023.

*Primary Examiner* — Thanh T Le
(74) *Attorney, Agent, or Firm* — Mattingly & Malur, PC

(57) ABSTRACT

The authentication and authorization system includes an application execution unit, a user information storage unit, a token acquisition unit configured to acquire, using the user information acquired from the user information storage unit, an access token from an authorization server that authorizes the application to use the external service when a valid access token is presented via the cooperation unit, and a token storage unit configured to store the acquired access token. The token acquisition unit acquires the access token from the authorization server at a predetermined cycle, and stores it in the token storage unit. When the application uses the external service, the application execution unit requests a cooperation unit to make the application cooperate with the external service using the access token acquired from the token storage unit.

5 Claims, 7 Drawing Sheets

(56) References Cited

U.S. PATENT DOCUMENTS

| | | | |
|---|---|---|---|
| 2016/0063471 A1* | 3/2016 | Kobres | G06Q 20/40 |
| | | | 705/18 |
| 2017/0012967 A1* | 1/2017 | Holloway | H04L 63/0823 |
| 2017/0034775 A1* | 2/2017 | Mandanapu | H04M 15/8207 |
| 2017/0111338 A1 | 4/2017 | Malatesha et al. | |
| 2017/0171179 A1* | 6/2017 | Buendgen | H04L 9/3263 |
| 2018/0191701 A1* | 7/2018 | Kong | H04L 63/0807 |
| 2019/0319967 A1* | 10/2019 | Holt | H04L 63/108 |
| 2019/0349357 A1* | 11/2019 | Shukla | H04L 63/20 |
| 2019/0372962 A1* | 12/2019 | Maria | H04L 63/108 |
| 2020/0021574 A1* | 1/2020 | Pinner | H04L 63/102 |
| 2020/0242227 A1* | 7/2020 | Bowness | G06F 21/34 |
| 2020/0364354 A1* | 11/2020 | Schwartz | G06F 21/6245 |
| 2021/0006496 A1* | 1/2021 | Xiong | H04L 67/02 |
| 2021/0073406 A1* | 3/2021 | Staler | G06F 11/0772 |
| 2021/0297862 A1* | 9/2021 | Fukuda | G06Q 20/3552 |

\* cited by examiner

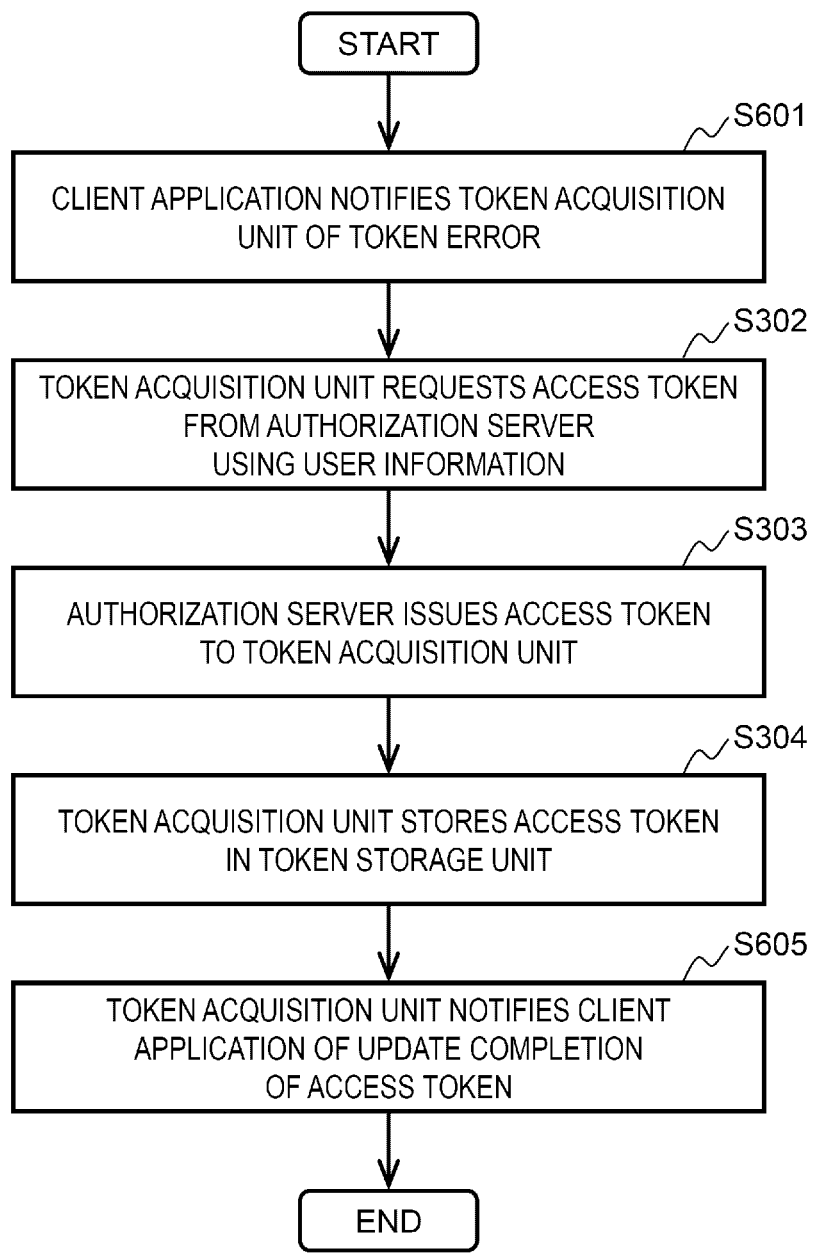

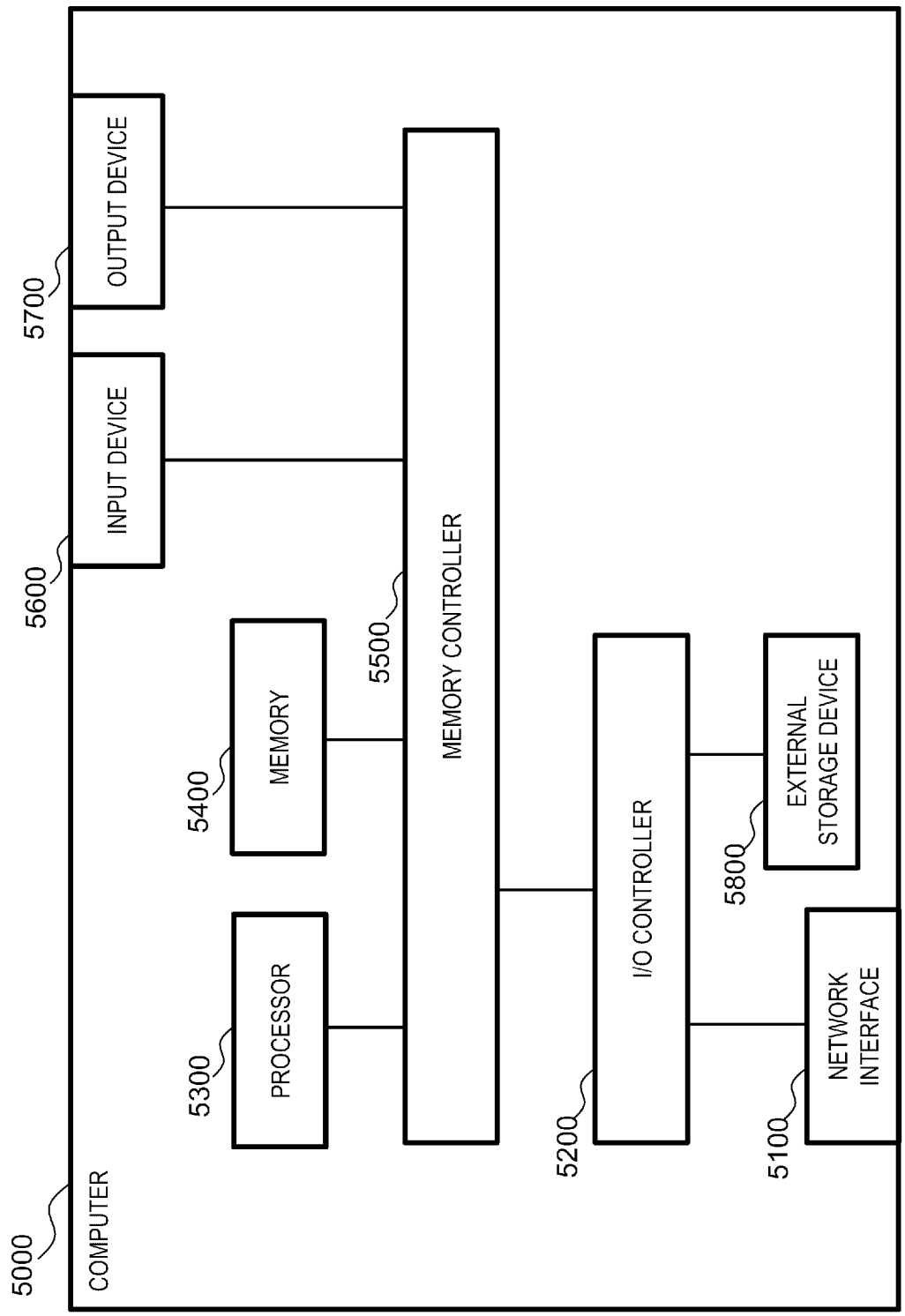

AUTHENTICATION AND AUTHORIZATION SYSTEM AND AUTHENTICATION AND AUTHORIZATION METHOD USING ACCESS TOKENS

CROSS-REFERENCE TO RELATED APPLICATION

The present application claims priority from Japanese application JP 2019-220470, filed on Dec. 5, 2019, the contents of which is hereby incorporated by reference into this application.

BACKGROUND OF THE INVENTION

1. Field of the Invention

The present invention relates to an authentication and authorization system and an authentication and authorization method.

2. Description of the Related Art

In development of an application, a new application may be constructed by cooperating with various types of software already provided as services, such as a database service and a voice recognition service. Use of these cooperation services (hereinafter referred to as external service) is implemented by performing a call using an application programming interface (API) from programs constituting the application. Accordingly, application developers can easily use functions of the various services.

On the other hand, some external services require usage licenses. When the external services are used, authentication processing for authenticating a service user (hereinafter referred to as user) and authorization processing for authorizing the authenticated service user to use the service are performed, and the use of the service is permitted only when the service is authorized. As a method of performing the authorization processing, use of an OAuth is exemplified. The OAuth is a protocol for permitting an access to a service (user resource) for which the user has a usage license instead of permitting the user.

Further, in the OAuth, since the authorization processing is performed by replacing an user ID and a password required to access the user resource with key information called access token, cooperation with the external service is implemented without disclosing the user ID and the password to an application (client application) for accessing the user resource.

When the access to the external service is performed via the API, an API providing device such as an API Gateway that bundles and manages accesses to a plurality of services is used, and a plurality of API providing devices may be required depending on the external service to be cooperated or a system configuration. In this case, it is necessary to manage the access token for the client application to access the user resource, a client ID used for client identification when the access token is issued, a client secret, and the like for each of the API providing devices. Methods for reducing this management burden include Patent Literature 1 (JP-A-2019-139621).

In the OAuth, it is necessary to input the user ID and the password by the user in order to issue the access token, but an effective period is set for the access token and the access token is invalidated when a certain period of time elapses. In this case, the client application cannot access the user resource and the user needs to re-input the user ID and the password to reissue the access token. In order to reduce the number of steps, a method of storing the user ID and the password in the client application may be considered, but there is a risk that the stored user ID and the stored password may flow out when the client application receives some security attack.

Further, in order to reduce the number of steps required for reissuing the access token associated with expiration of the access token, there is an effective method of preventing the access token from expiring by performing access token acquisition processing regularly instead of at a timing when the client application accesses the user resource, and storing a latest access token in the client application.

However, in this method, since the timing at which the client application accesses the user resource and an acquisition timing of the access token are asynchronous, the client application may use an expired access token depending on the timings.

SUMMARY OF THE INVENTION

Therefore, one object of the invention is to deal with, in an authentication and authorization system that performs authentication and authorization of an external service with which a client application cooperates, expiration of an access token which occurs when an access token acquisition timing and a service usage timing are asynchronous while preventing leakage of user information such as a user ID and a password.

In order to solve this technical problem, the invention provides, as one aspect, an authentication and authorization system configured to perform authentication and authorization when an external service with which an application executed by a user cooperates is used via a cooperation unit. The authentication and authorization system includes: an application execution unit configured to execute the application; a user information storage unit configured to store user information of the user; a token acquisition unit configured to acquire, using the user information acquired from the user information storage unit, an access token from an authorization server that authorizes the application to use the external service when a valid access token is presented via the cooperation unit; and a token storage unit configured to store the access token acquired by the token acquisition unit. The token acquisition unit is configured to acquire the access token from the authorization server at a predetermined cycle and store the acquired access token in the token storage unit. The application execution unit is configured to, when the application uses the external service, acquire the access token from the token storage unit, and request the cooperation unit to make the application cooperate with the external service using the acquired access token.

According to the invention, for example, in the authentication and authorization system that performs the authentication and authorization of the external service with which the client application cooperates, when the number of steps for acquiring an access token required for external service usage authorization is reduced, it is possible to deal with expiration of an access token which occurs when an access token acquisition timing and a service usage timing are asynchronous while preventing leakage of user information such as a user ID and a password.

BRIEF DESCRIPTION OF THE DRAWINGS

FIG. 6 is an example of a flowchart showing a flow of access token reacquisition processing by a token acquisition unit in the second embodiment.

FIG. 7 is a diagram showing an example of hardware of a computer for implementing an authentication and authorization system.

DESCRIPTION OF THE PREFERRED EMBODIMENTS

Figure 1:
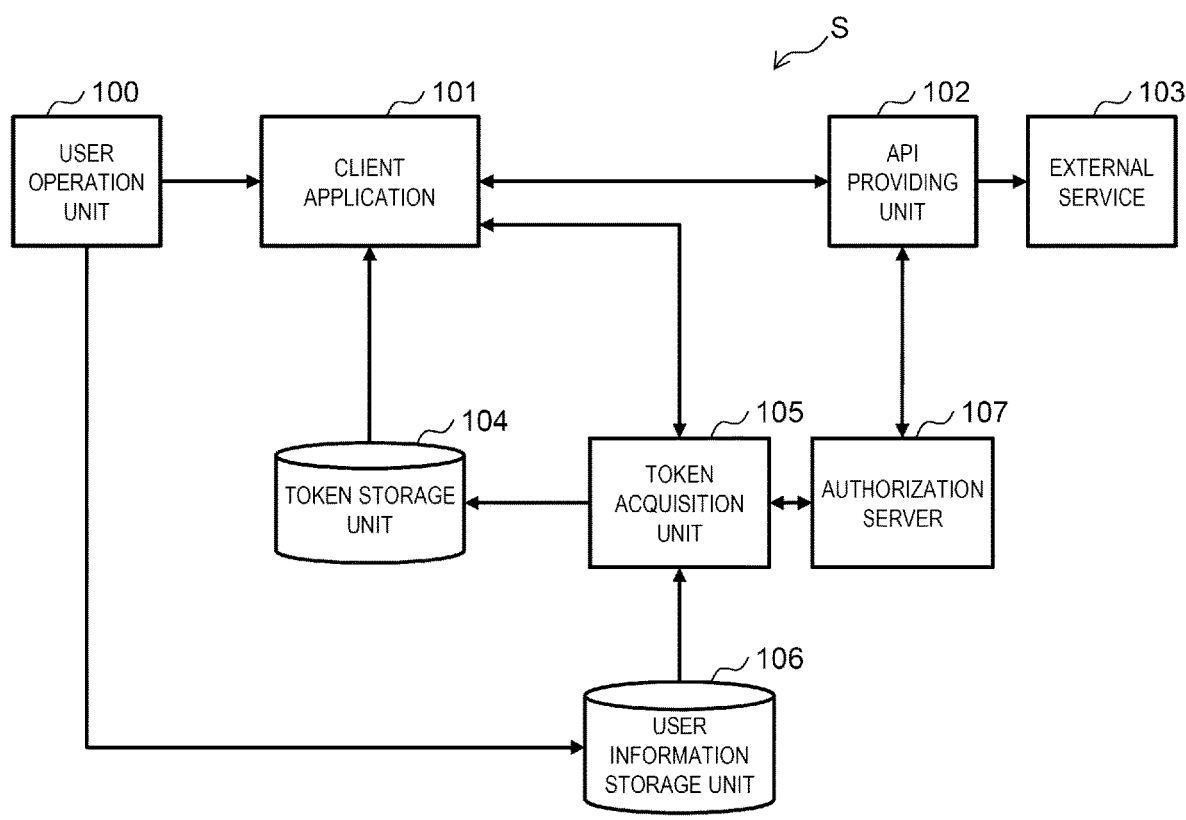
FIG. 1 is a diagram showing an example of a functional configuration of an authentication and authorization system in a first embodiment.

Hereinafter, embodiments will be described with reference to the drawings. It should be noted that the following embodiments are merely exemplary, and the invention itself is not intended to be limited to the following specific contents.

In the following description, the same or similar elements and processing are denoted by the same reference numerals, and a repetitive description thereof will be omitted. Further, in the following embodiments, only differences from the foregoing embodiments will be described, and a repetitive description will be omitted.

The description of the following embodiments and the configurations and the processing shown in the drawings show outlines of the embodiments to an extent necessary for understanding and performing the invention, and are not intended to limit the embodiments of the invention. Further, each of the embodiments and each of the modifications can be partly or wholly combined within a range of matching with each other without departing from the spirit of the invention.

First Embodiment

The present embodiment shows, in an authentication and authorization system that performs authentication and authorization of an external service with which a client application cooperates, a method of managing user information required for external service usage authorization separately from the client application, regularly acquiring an access token required for service usage, and storing the access token in the client application, and processing for dealing with expiration of an access token which occurs when an access token acquisition timing and a service usage timing are asynchronous.

<Functional Configuration of Authentication and Authorization System S in First Embodiment>

First, an example of a functional configuration of an authentication and authorization system S in the present embodiment will be described with reference to FIG. 1. FIG. is a diagram showing the example of the functional configuration of the authentication and authorization system S in the first embodiment. As shown in FIG. 1, the authentication and authorization system S includes a user operation unit 100, a client application 101, an API providing unit 102, an external service 103, a token storage unit 104, a token acquisition unit 105, a user information storage unit 106, and an authorization server 107.

First, a method of cooperating the client application 101 with the external service 103 will be described. A user who uses the authentication and authorization system S executes the client application 101 by operating the user operation unit 100. The client application 101 is an example of an application execution unit. Further, the client application 101 includes execution processing of the external service 103 which requires a usage licenses. The client application 101 calls an external service access API provided by the API providing unit 102 to execute the external service 103. The API providing unit 102 is an example of a cooperation unit.

At this time, the client application 101 presents an access token required to use the external service 103 to the API providing unit 102. The API providing unit 102 confirms to the authorization server 107 whether the presented access token is valid, and when the access token is valid, provides a resource of the external service 103 to the client application 101. Accordingly, cooperative processing of the client application 101 and the external service 103 can be implemented.

Next, a method of acquiring the access token required for the client application 101 to use the external service 103 will be described. It is assumed that the user who uses the authentication and authorization system S has the usage license for the external service 103, or that when the external service 103 is registered as an authorization target of the authorization server 107 and the user who logs in to the authorization server 107 has the license of the external service 103, the authorization server 107 can permit the use of the external service 103.

The token acquisition unit 105 acquires, from the user information storage unit 106, a user ID and a password (hereinafter, referred to as user information) for logging in to the authorization server 107, regularly accesses the authorization server 107, and acquires the access token required to use the external service 103 from the authorization server 107.

The user information is stored in the user information storage unit 106 by operating the user operation unit 100 in advance by the user. Further, the token acquisition unit 105 stores the acquired access token at any time in the token storage unit 104. Accordingly, the access token presented by the client application 101 to the API providing unit 102 can be obtained by referring to the token storage unit 104 by the client application 101.

<Specific Configuration of Authentication and Authorization System S of First Embodiment>

Figure 2:
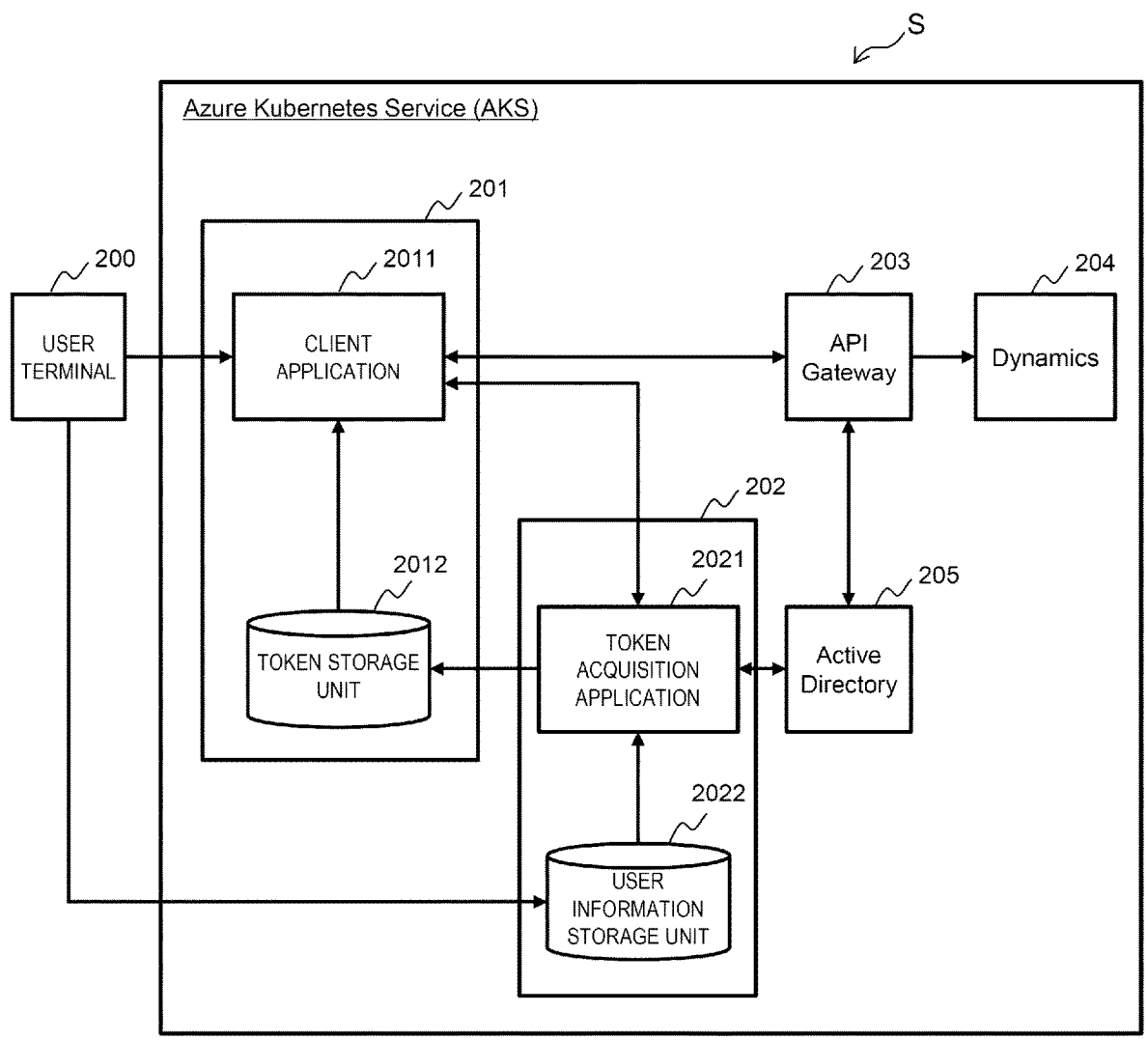
FIG. 2 is a diagram showing an example of a specific configuration of the authentication and authorization system in the first embodiment.

Here, an example in which the configuration of the authentication and authorization system S in the present embodiment is embodied will be described with reference to FIG. 2. FIG. 2 is a diagram showing an example of the specific configuration of the authentication and authorization system S in the first embodiment. Here, an example of a case is shown in which elements except for the user operation unit 100 of the configuration of the authentication and authorization system S shown in FIG. 1 are built on an Azure (registered trademark (same below)) kubernetes service (hereinafter referred to as AKS) provided by the Microsoft (registered trademark (same below)) Corporation. The AKS is an example of a public cloud service.

A user terminal 200 corresponds to the user operation unit 100, and is a terminal having a function of inputting information by the user, such as a personal computer (PC) or a tablet terminal. A client service Pod 201 is launched on the AKS, and a client application 2011 corresponding to the client application 101 in this client service Pod 201 is operated as a container service. Then, a volume of the client service Pod 201 is used as a token storage unit 2012.

Further, a token acquisition service Pod 202 is launched on the AKS, and a token acquisition application 2021 corresponding to the token acquisition unit 105 in this token acquisition service Pod 202 is operated as a container service. Then, a volume of the token acquisition service Pod 202 is used as a user information storage unit 2022.

In this way, by disposing the client application 2011 and the user information storage unit 2022 in different pods, it is possible to prevent leakage of the user ID and the password even when the client application 2011 receives some security attack.

Further, the API providing unit 102 and the authorization server 107 can be implemented by using an API Gateway 203 and an Active Directory (registered trademark (same below)) 205 provided by the Azure, respectively.

Here, a case is shown in which a Dynamics (registered trademark (same below)) 204 provided by the Microsoft Corporation is used as the external service 103. The Dynamics is a business information system service, and enables service cooperation, such as performing incident registration on the Dynamics, based on processing of the client application 2011.

<Regular Access Token Acquisition Processing of Token Acquisition Unit 105 of First Embodiment>

Figure 3:
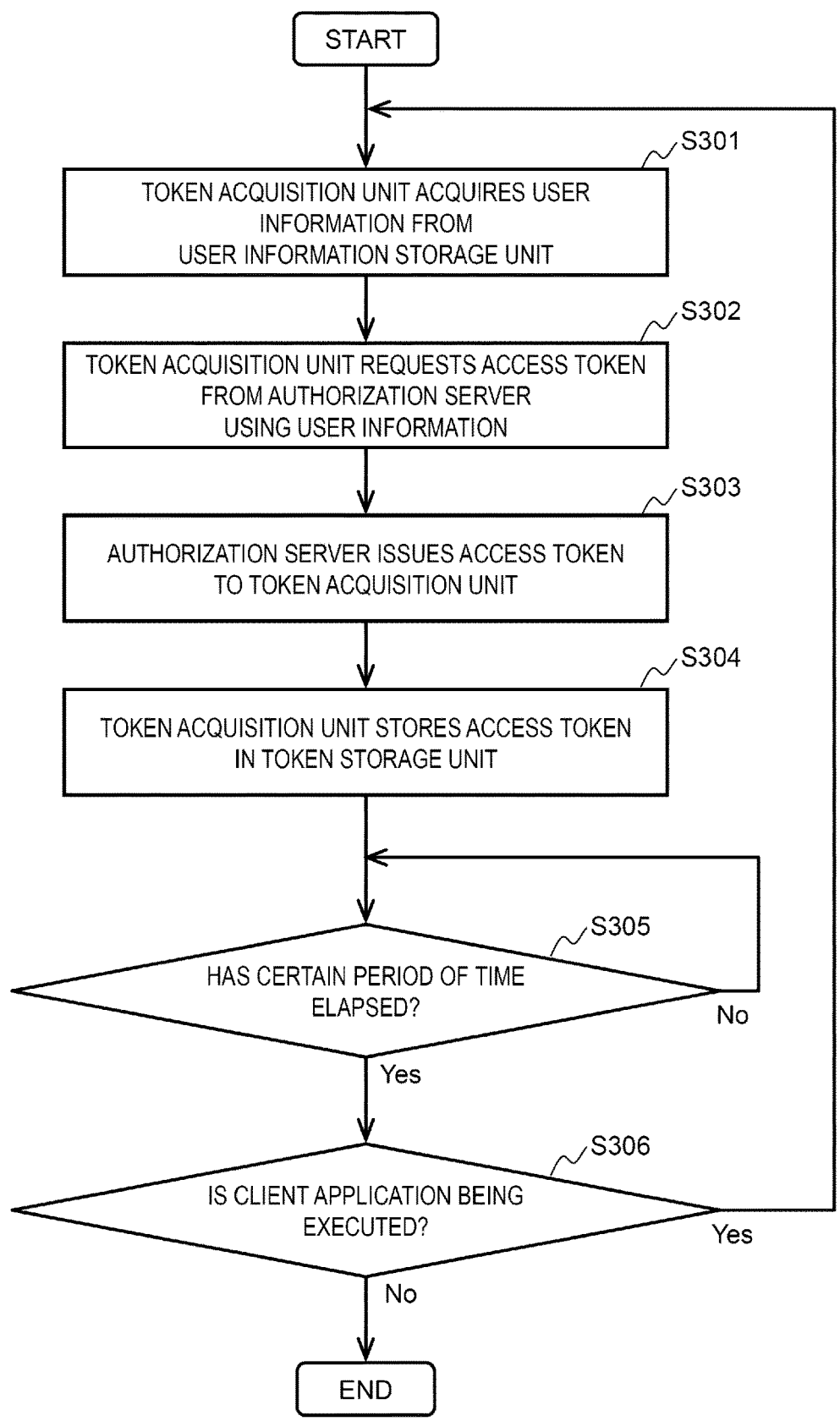
FIG. 3 is an example of a flowchart showing a flow of regular access token acquisition processing by a token acquisition unit in the first embodiment.

Next, an example of a flow of processing of the authentication and authorization system in the present embodiment will be described with reference to flowcharts of FIGS. 3 and 4. FIG. 3 is an example of a flowchart showing the flow of regular access token acquisition processing by the token acquisition unit 105 in the first embodiment. The regular token acquisition processing is regularly executed at a regular cycle.

First, the token acquisition unit 105 acquires the user information for accessing the authorization server 107 from the user information storage unit 106 (S301). Next, the token acquisition unit 105 accesses the authorization server 107 using the acquired user information, and requests the access token to be used by the client application 101 for usage authorization of the external service 103 (S302).

Next, the authorization server 107 collates the user information, issues the access token for permitting the use of the external service 103 for which the user has the license, and provides the access token to the token acquisition unit 105 (S303). Further, the token acquisition unit 105 stores the access token acquired from the authorization server 107 in the token storage unit 104 (S304). The token acquisition unit 105 determines whether a certain period of time has elapsed (S305), and confirms an execution state of the client application 101 after the certain period of time has elapsed (S305 Yes) (S306). When the client application 101 is being executed, the token acquisition unit 105 returns to processing of S301 and restarts the acquisition processing of the access token. Accordingly, the regular acquisition of the access token in a predetermined cycle and storage in the token storage unit 104 can be implemented.

<Usage Processing of External Service 103 of First Embodiment>

Figure 4:
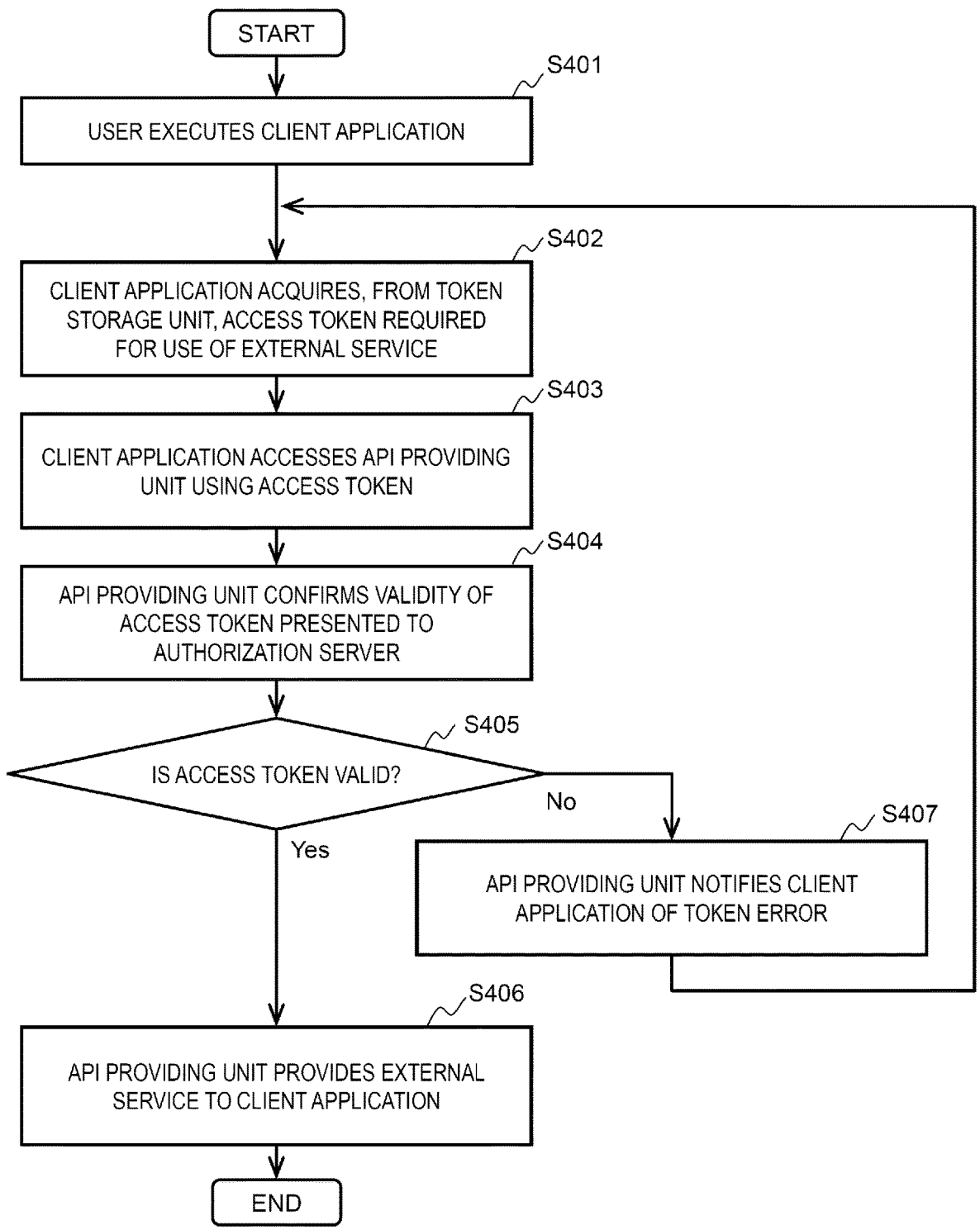
FIG. 4 is an example of a flowchart showing a flow of usage processing of an external service by a client application in the first embodiment.

FIG. 4 is an example of a flowchart showing the flow of usage processing of the external service 103 by the client application 101 in the first embodiment.

First, the client application 101 is executed according to an operation of the user operation unit 100 by the user (S401). Next, the client application 101 acquires, from the token storage unit 104, the access token required for the usage authorization of the external service 103 to be called during the processing (S402).

Next, the client application 101 requests the API providing unit 102 to provide the resource of the external service 103 using the access token acquired from the token storage unit 104 (S403). Next, the API providing unit 102 confirms the validity of the access token presented by the client application 101 to the authorization server 107 (S404).

Next, the API providing unit 102 determines whether the access token is valid as a result of collating the access token by the authorization server 107 (S405). When the access token is valid (S405 Yes), the API providing unit 102 provides the resource of the external service 103 to the client application 101 (S406).

On the other hand, when the access token is not valid because it has expired as a result of collating the access token by the authorization server 107 (S405 No), the API providing unit 102 notifies the client application 101 of a token error (S407). The client application 101 which receives the token error returns to the processing of S402, reacquires the access token required for the usage authorization of the external service 103 from the token storage unit 104, and performs usage authorization processing of the external service 103 with a new access token. Accordingly, the use of the external service 103 by the client application 101 is implemented.

Effect of First Embodiment

According to the present embodiment, by regularly acquiring a token from the authorization server 107 and updating a token stored in the token storage unit 104, the token stored in the token storage unit 104 can be kept within an expiration date. Therefore, since the token within the expiration date can be acquired without inputting the user information each time for acquiring the token when the application cooperated with the external service requiring for the authorization processing is executed, the token expiration at the time of application execution can be prevented and convenience of the cooperation between the application and the external service can be improved.

Further, according to the present embodiment, since the user information storage unit 106 is disposed and managed independently of the client application 101, the cooperation with the external service can be implemented without disclosing the user information to the client application 101, and leakage of the user information can be avoided even when the client application 101 receives security attack.

Modification of First Embodiment

In the present embodiment, FIG. 2 shows the example in which the configuration of the authentication and authorization system S is embodied. In the description thereof, the example has been shown in which the elements except for the user terminal 200 are built on the AKS. However, the elements may be built on the other public cloud services such as Amazon (registered trademark (same below)) Elastic Kubernetes Service (Amazon EKS). When the elements are built on the Amazon EKS, Amazon Cognito (registered trademark (same below)) provided by Amazon can be used as the authorization server 107.

Further, in FIG. 2, the API Gateway 203 corresponding to the API providing unit 102, the Dynamics 204 corresponding to the external service 103, and the Active Directory 205 corresponding to the authorization server 107 are built on the AKS. However, the invention is not limited thereto, and a part of the configuration of the authentication and authorization system S such as the API providing unit 102, the external service 103, and the authorization server 107 may be built on another cloud service or an on-premise outside the cloud service.

Further, the present embodiment describes the method of regularly acquiring the access token by the token acquisition unit 105. Regarding an interval, in addition to using an interval set in advance by a provider of the authentication and authorization system, the system user may freely set and change the interval in consideration of the expiration date provided in the access token. A method of freely setting the interval can be implemented by providing a region for storing the access token acquisition interval in the user information storage unit 106 and reading information thereof by the token acquisition unit 105. At this time, a storage method of the access token acquisition interval for the user information storage unit 106 can be implemented by an operation of the user operation unit 100 by the user. The token acquisition unit 105 newly acquires an access token from the authorization server 107 at a predetermined cycle based on the information of the access token acquisition interval read from the user information storage unit 106 and updates the previously acquired access token stored in the token storage unit 104. The predetermined cycle is, for example, a cycle when the access token previously acquired and stored in the token storage unit 104 is updated with a new access token acquired this time from the authorization server 107 within an expiration date of the previous access token.

Further, there is no restriction on an authorization protocol used in the authentication and authorization system S. For example, the authorization method may use the OAuth protocol or another protocol.

Second Embodiment

The present embodiment describes a method of requesting, by the client application 101, the token acquisition unit 105 to reissue a token as a method of dealing with expiration of an access token which occurs when an access token acquisition timing and a service usage timing are asynchronous.

<Usage Processing of External Service 103 of Second Embodiment>

Figure 5:
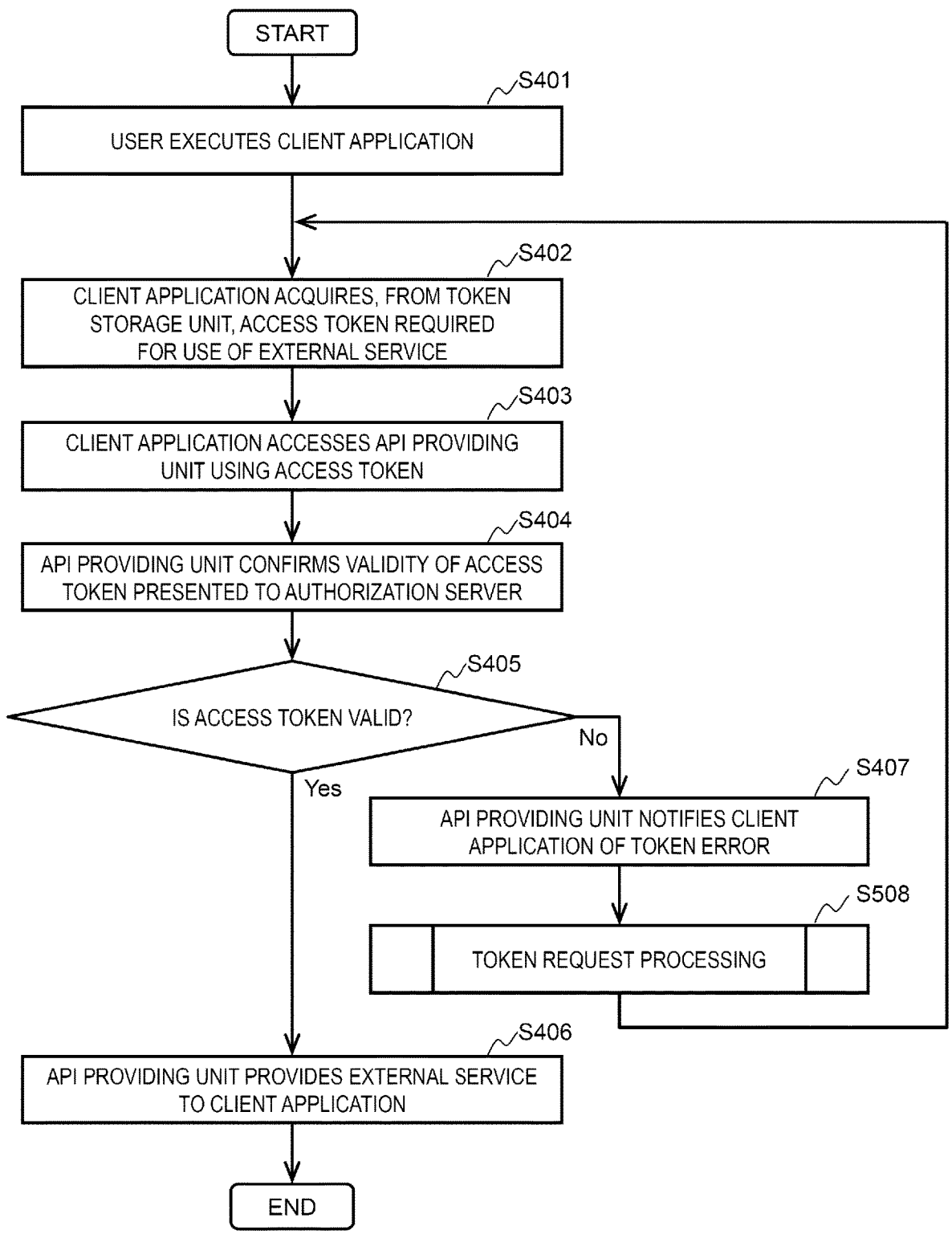
FIG. 5 is an example of a flowchart showing a flow of usage processing of an external service by a client application in a second embodiment.

An example of a flow of processing of an authentication and authorization system in the present embodiment will be described with reference to flowcharts of FIGS. 5 and 6. FIG. 5 is an example of a flowchart showing the flow of the usage processing of the external service 103 by the client application 101 in the second embodiment. The usage processing of the external service 103 of the second embodiment is different from the usage processing of the external service 103 of the first embodiment in that S508 is executed subsequent to S407, and the rest processing is the same.

The first embodiment describes the method of re-obtaining an access token from the token storage unit 104 and executing the usage authorization processing of the external service 103 with the new access token when the client application 101 receives a token error from the API providing unit 102. And the present embodiment is different in that a token reissue request (S508) is issued to the token acquisition unit 105. Hereinafter, only this difference will be described below.

In S508 subsequent to S407, after the authorization server 107 issues a valid token to the token acquisition unit 105 by executing token request processing, the client application 101 which receives the token error returns to the processing of S402 and re-executes a usage authorization processing of the external service 103 with the new access token. Accordingly, the use of the external service 103 by the client application 101 is implemented.

<Access Token Reacquisition Processing of Token Acquisition Unit 105 of Second Embodiment>

FIG. 6 is an example of a flowchart showing the flow of access token reacquisition processing by the token acquisition unit 105 in the second embodiment, and shows detailed processing of S508.

First, the client application 101 receives a token error returned from the API providing unit 102, and notifies the token acquisition unit 105 of the token error (S601). Subsequent S302 to S304 are the same as S302 to S304 shown in FIG. 3.

Subsequent to S304, the token acquisition unit 105 notifies the client application 101 of update completion of the access token (S605). Accordingly, processing is implemented to deal with the expiration of the access token which occurs when the access token acquisition timing and the usage timing of the external service 103 by the client application 101 are asynchronous.

Effect of Second Embodiment

According to the present embodiment, when a token error of expiration occurs when the application is executed, by acquiring a token which is not regularly acquired from the authorization server 107 at a timing at which a token error occurs and updating the token stored in the token storage unit 104, the token error can be dealt with more quickly and the token error can be resolved.

Modification of Second Embodiment

The present embodiment describes the method of requesting, by the client application 101, the reissue of the access token by notifying the token acquisition unit 105 of the token error when the access token used for usage authorization of the external service 103 has expired. However, a trigger of the access token reissue request when the access token has expired need not be limited to the error notification from the client application 101 to the token acquisition unit 105 (S601). For example, the token acquisition unit 105 may regularly monitor an error output of the client application 101, and when the token error is detected, the reissuing processing of the access token may be started.

Further, in the reissuing processing of the access token, the method of reacquiring, by the client application 101, the access token triggered by the update completion notification (S605) of the access token to the client application 101 by the token acquisition unit 105 has been shown. However, it is not always necessary to use the update completion notification by the token acquisition unit 105 as the trigger. For example, since the token acquisition unit 105 regularly acquires the access token and stores the access token in the token storage unit 104, a valid access token is stored in the token storage unit 104 after a certain period of time elapses after the token error is detected. Therefore, when the client application 101 receives the access token error from the API providing unit 102, the usage authorization processing of the external service 103 may be voluntarily re-executed after a certain period of time.

In the above-described first and second embodiments, the client application 101 can also use a plurality of external services 103. In this case, the access token is managed in the token storage unit 104 for each external service 103. Further, the client application 101 acquires an access token associated with the external service 103 to be used from the token storage unit 104 and uses it.

Further, in the authentication and authorization system S, a plurality of client applications 101 may operate in one container, and the token storage unit 104 may manage the access token of the external service 103 for each client application 101.

Further, in the first and second embodiments, the client application 101 may store the access token of the external service 103 to be used without providing the token storage unit 104.

<Hardware of Computer for Implementing Authentication and Authorization System S>

FIG. 7 is a diagram showing an example of hardware of a computer for implementing the authentication and authorization system S. In a computer 5000 for implementing the authentication and authorization system S, a processor 5300 typified by a central processing unit (CPU), a memory 5400 such as a random access memory (RAM), an input device 5600 (for example, a keyboard, a mouse, a touch panel), and an output device 5700 (for example, a video graphics card connected to an external display monitor) are connected with each other through a memory controller 5500. In the computer 5000, a predetermined program is read from an external storage device 5800 such as an SSD or an HDD via an I/O (Input/Output) controller 5200 and executed by cooperation of the processor 5300 and the memory 5400, so that the authentication and authorization system S is implemented. Alternatively, each program for implementing the authentication and authorization system S may be acquired from an external computer by communication via a network interface 5100. Alternatively, programs for implementing the authentication and authorization system S may be stored in a portable storage medium, read by a medium reading device, and executed by cooperation of the processor 5300 and the memory 5400.

The invention is not limited to the above-mentioned embodiments, and includes various modifications. For example, the above-mentioned embodiments have been described in detail for easy understanding of the invention, and the invention is not necessarily limited to those including all the configurations described above. Apart of a configuration of one embodiment can be replaced with a configuration of another embodiment, and a configuration of another embodiment can be added to a configuration of one embodiment. A part of the configuration of each embodiment may be added to, deleted from, or replaced with another configuration. Further, each step in the processing of each embodiment may be executed by appropriately changing the order as long as the same result can be obtained.

A part or all of the configurations, functions, processing units, processing methods or the like described above may be implemented by hardware such as through design using an integrated circuit. Further, the above-mentioned configurations, functions, and the like may be implemented by software by means of a processor interpreting and executing a program for implementing corresponding functions. Information such as a program, a table, a file, and the like that implements each function can be stored in a storage unit such as a memory, a hard disk, and a solid state drive (SSD), or an IC card, a semiconductor recording medium, a magnetic recording medium, and an optical recording medium.

Control lines or information lines indicate what is considered necessary for description, and not all control lines or information lines are necessarily shown in a product. In practice, it may be considered that almost all configurations are connected to each other.

What is claimed is:

1. An authentication and authorization system configured to perform authentication and authorization, comprising:
a first computer;
a second computer connected to the first computer;
a third computer configured to be connected to the first computer, the third computer providing an external service; and
an authorization server connected to the second computer,
wherein the first computer is configured to execute an application;
wherein the second computer is configured to: store user information of a user, the user information including an acquisition interval of an access token,
acquire, using the stored user information, the access token from the authorization server at a predetermined cycle based on the acquisition interval from the stored user information, the access token authorizes the application to use the external service when the access token is presented and determined to be valid,
store the acquired access token in a token storage,
provide an application programming interface (API) to the application,
when the application is being executed to use the external service, acquire the access token from the token storage, and provide a resource from the external service to the application using the acquired access token via the API,
periodically determine whether the acquired access token has expired,
upon determining the acquired access token has expired, determine whether the application is currently being executed, and upon determining the acquired access token has expired and the application is currently being executed, reacquire an access token from the authorization server,
wherein the first computer executes the external service via the API.

2. The authentication and authorization system according to claim 1,
wherein the first computer cannot access the user information stored in the second computer.

3. The authentication and authorization system according to claim 1,
wherein the second computer is configured to:
when a token error occurs in which the access token is determined to be invalid, reacquire an access token from the token storage unit, and provide the resource from the external service to the application using the reacquired access token.

4. The authentication and authorization system according to claim 1,
wherein the second computer is configured to:
when a token error occurs in which the access token is determined to be invalid, reacquire an access token from the authorization server, and store the reacquired access token in the token storage, and
after the reacquired access token is stored in the token storage unit, reacquire the access token from the token storage, and provide the resource from the external service to the application using the reacquired access token.

5. An authentication and authorization method of an authentication and authorization system, the authentication and authorization system including: a first computer; a second computer connected to the first computer; a third computer configured to be connected to the first computer, the third computer providing an external service; and an authorization server connected to the second computer, the method comprising:

executing an application, by the first computer;

executing, by the second computer:

storing user information of a user, the user information including an acquisition interval of an access token;

acquiring, using the stored user information, the access token from the authorization server at a predetermined cycle based on the acquisition interval from the stored user information, the access token authorizes the application to use the external service when the access token is presented and determined to be valid;

storing the acquired access token in a token storage;

providing an application programming interface (API) to the application;

when the application is being executed to use the external service, acquiring the access token from the token storage, and providing a resource from the external service to the application using the acquired access token via the API;

periodically determining whether the acquired access token has expired;

upon determining the acquired access token has expired, determining whether the application is currently being executed, and upon determining the acquired access token has expired and the application is currently being executed, reacquiring an access token from the authorization server, wherein the first computer executes the external service via the API.

* * * * *